United States Patent [19]

Ainlay

[11] Patent Number: 4,561,291
[45] Date of Patent: * Dec. 31, 1985

[54] LEAK DETECTOR FOR UNDERGROUND STORAGE TANKS

[76] Inventor: John A. Ainlay, 3330 Grant St., Evanston, Ill. 60201

[ * ] Notice: The portion of the term of this patent subsequent to Oct. 2, 2001 has been disclaimed.

[21] Appl. No.: 639,686

[22] Filed: Aug. 10, 1984

Related U.S. Application Data

[63] Continuation-in-part of Ser. No. 458,349, Jan. 17, 1984, Pat. No. 4,474,054.

[51] Int. Cl.⁴ ............................................. G01M 3/30
[52] U.S. Cl. ........................................ 73/49.2; 73/302
[58] Field of Search ....................... 73/49.2, 302, 747

[56] References Cited

U.S. PATENT DOCUMENTS

| | | | |
|---|---|---|---|
| 841,454 | 1/1907 | Sargent | 73/747 |
| 1,100,867 | 6/1914 | Dexter | 73/302 |
| 1,352,038 | 9/1920 | Szekely | 73/747 |
| 1,687,506 | 10/1928 | Novick | 73/302 |
| 1,759,873 | 5/1930 | Shewmon | 73/302 |
| 1,819,655 | 8/1931 | Mohr | 73/302 |
| 1,822,458 | 9/1931 | Rowland et al. | 73/302 X |
| 2,012,511 | 8/1935 | Hubbard | 73/302 |
| 2,041,859 | 5/1936 | Pyle, 3rd et al. | 73/302 |
| 3,209,597 | 10/1965 | Fowler | 73/747 |
| 3,473,387 | 10/1969 | Meriam | 73/747 |
| 3,834,236 | 9/1974 | Durin | 73/302 |
| 3,926,057 | 12/1975 | Baker | 73/747 |

Primary Examiner—Stewart J. Levy
Assistant Examiner—Joseph W. Roskos
Attorney, Agent, or Firm—McDougall, Hersh & Scott

[57] ABSTRACT

A portable, self-contained leak detection apparatus is provided which is particularly adapted for detecting a relatively small leak in a large fluid storage tank having a fill pipe. The apparatus comprises an air-tight chamber containing a liquid; a slope tube communicating between the liquid in the chamber and the atmosphere, wherein at least a portion of the slope tube extends along the outer surface of the chamber; a source of compressed gas in gaseous communication with the chamber; and a tube for communicating gas between the chamber and the fill pipe of the storage tank.

6 Claims, 3 Drawing Figures

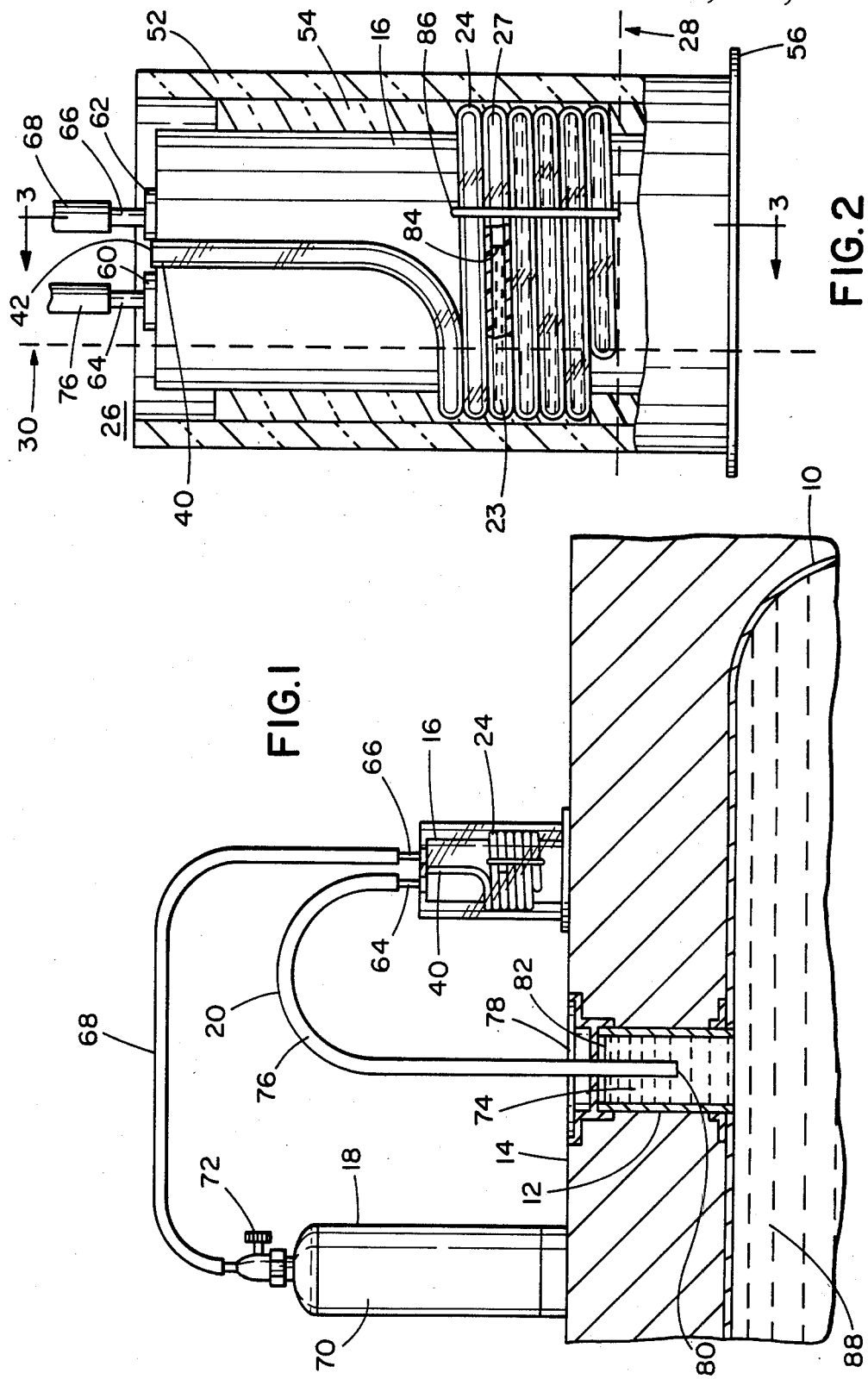

LEAK DETECTOR FOR UNDERGROUND STORAGE TANKS

BACKGROUND OF THE INVENTION

This application is a continuation-in-part of Ser. No. 458,349, filed Jan. 17, 1983, now U.S. Pat. No. 4,474,054.

This invention relates to the field of analytical instruments. More specifically, it relates to the field of instruments for testing underground storage tanks or other inaccessible tanks for leaks.

Recent government regulations have required the detection and correction of relatively minor leaks in underground storage tanks which contain various chemicals, such as gasoline, kerosine, diesel fuel and the like, which may have a deleterious effect if they make their way into the soil and/or ground water. These regulations may require the detection and correction of leaks as small as 0.05 gallons per hour.

It is not practical to visually inspect underground tanks for leaks. Further should a leak occur, it is relatively expensive to repair the tank. Accordingly, there is a need to know whether or not a tank is leaking and, if so, the extent of the leak in order that an informed judgment may be made concerning whether the leak should be repaired.

A variety of testing systems for underground tanks are known in the art. Perhaps the best known system is the Kent-Moore system. This system employs a circulating pump, a temperature recording instrument, a test stand pipe and a graduated cylinder. While this system is quite accurate, it is relatively complex and bulky.

While U.S. Pat. No. 4,474,054 discloses a simplified leak detection apparatus, this apparatus is relatively bulky to transport and requires more manipulation in using it for use in testing than the device of the present invention.

Other attempts at measuring leaks in underground tanks have been proposed. These devices, however, lack the simplicity, accuracy, portability and low cost of the present invention.

It is accordingly an object of the present invention to provide a tank-testing device which is portable and accurate, whereby underground storage tanks can be checked for leakage.

Another object of the invention is to provide a tank-testing device which is simple to operate and requires only easily obtained equipment for operation.

A further object of the invention is to provide a testing device capable of accurately measuring a relatively broad range of small leaks.

Other objects and advantages of the invention will be apparent from the remaining portion of the description.

BRIEF DESCRIPTION OF THE DRAWINGS

FIG. 1 is a schematic drawing showing a portion of a typical underground tank installation and the manner in which the invention may be employed to test for leaks.

FIG. 2 is an enlargement of a portion of FIG. 1 showing the details of the invention.

DETAILED DESCRIPTION

Figure 3:
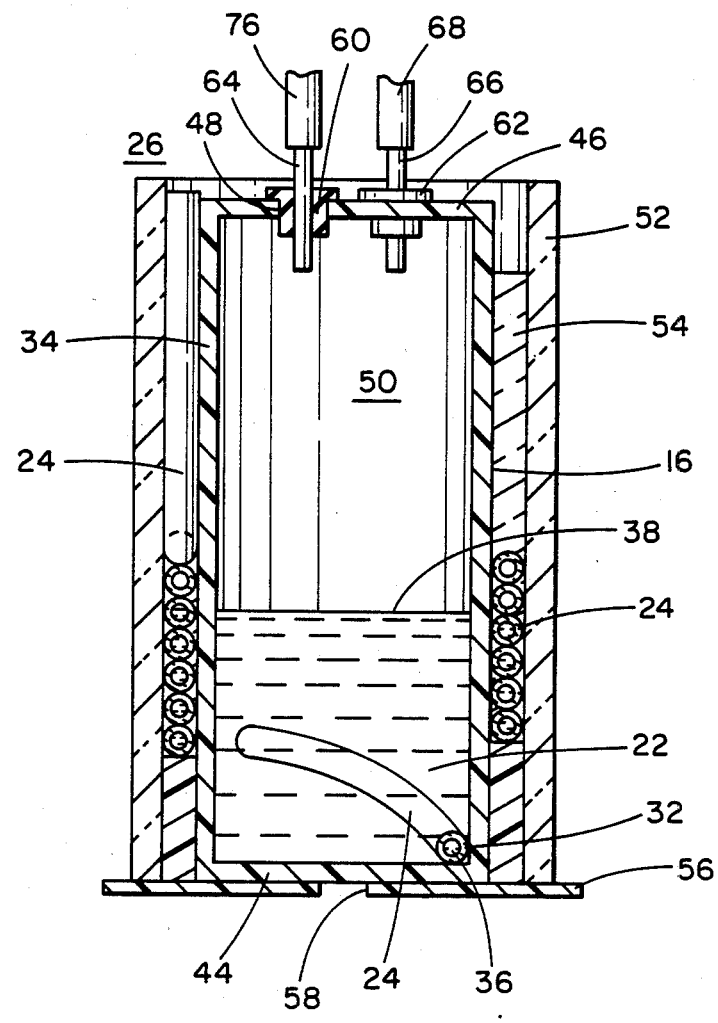
FIG. 3 is a sectional view through the line 3/3 of the embodiment depicted in FIG. 2.

Referring now to FIG. 1, a typical underground tank 10 is shown, the purpose of which is to store large quantities of a liquid such as gasoline, diesel fuel, methanol or other liquid chemical product. The liquid is dispensed by a pump mechanism (not shown) in a conventional manner. The underground tank 10 is periodically refilled via a fill pipe 12 which extends upwardly so as to communicate between the tank 10 and the surface 14.

As shown in FIGS. 1-3, the present invention comprises a portable self-contained apparatus which comprises an airtight chamber 16, a source of compressed gas 18 in communication with chamber 16, and a means 20 for gaseous communication between the chamber 16 and the fill pipe 12 of the tank 10.

Referring to FIG. 3, the airtight chamber 16 is at least partially filled with a liquid 22. A slope tube 24 communicates the liquid phase 22 and the external, gaseous environment 26. As shown in FIG. 2, under normal operating conditions this results in a portion of the slope tube being filled with liquid 23 from liquid 22 from inside chamber 16, and a portion of the slope tube being filled with air 27 from the external environment.

The configuration of the slope tube 24 preferably is such that at least a portion of the slope tube is helically coiled around the outside of the chamber. The angle of inclination of the slope tube coils is not critical to the present invention, but will affect the sensitivity of the apparatus, with the sensitivity decreasing at increasing angles of inclination. The number of turns the slope tube makes around the chamber is not critical. It is preferred, however, that the slope tube be wound around the chamber several times, such as six or more, so as to increase the pressure range the apparatus may be used to detect.

As shown in FIG. 3, one end 32 of the slope tube 24 extends into the liquid 22 inside the chamber, such as through an opening in the wall 34 of chamber 16. This end is positioned inside the chamber so that the tube openin 36 is well below the surface 38 of the liquid 22. As shown in FIG. 2, the other end 40 of the slope tube extends upward and ends in an upper opening 42 which is in communication with the atmosphere. In the preferred embodiment, the end 40 projects upward from the last coil of the slope tube to the top of the chamber at an angle which is substantially vertical and without kinking of the tubing. This prevents loss of the measuring liquid 22 in the event of a large increase in the height of the liquid in fill tube 12 of tank 10 during the test period.

The configuration of chamber 16 preferably comprises a hollow cylinder, which can conveniently be made of commercially available plumbing materials, such as a ten inch length of cylindrical PVC piping. Referring to FIG. 3, the top and bottom of the chamber are sealed, such as by end caps 44 and 46. At least one hole, such as shown at 48, is provided in the top end cap 46 to enable communication between the cylinder lumen 50 and the source of compressed gas and tank fill pipe.

A transparent cylinder 52 preferably surrounds chamber 16 to protect the slope tube 24. This cylinder is of slightly greater diameter than the combined diameter of chamber 16 and the coiled slope tube 24. If desired, a clear, sealing resin 4 such as a resin containing epoxy, is poured into the space between the chamber 16 and cylinder 52 to permanently fix the slope tube in place between the concentric cylinders.

A small, square, substantially planar base 56 may be added to the bottom of the chamber apparatus to stabilize it in an upright position. Additionally, if desired, a threaded hole 58 may be drilled in the base 56 to allow the apparatus to be attached to a tripod (not shown) for easy, eye-level viewing during use.

Rubber stoppers 60 and 62 are provided to seal the holes in end cap 46, such as stopper 60 in hole 48. A length of relatively rigid tubing 64, 66, such as conventional copper tubing, projects through stopper 60, 62, respectively to permit communication with the lumen 50 of chamber 16.

A length of flexible tubing 68, such as rubber tubing is attached to rigid tube 66 and permits communication between the chamber 16 and the source of compressed gas 18. This source of compressed gas is usually a tank 70 containing a gas, such as air, under pressure. Tank 70 preferably has a valve 72 which permits the compressed gas to be shut off during set up and disassembly of the test equipment. When open, however, the gas is expelled from the tank and travels through flexible tube 68, rigid tube 66 and stopper 62 to the chamber lumen 50.

In turn, the gas in the chamber lumen 50 is communicated to the liquid 74 in the fill pipe 12 by means of a flexible bubble tube 76. This bubble tube 76 is attached to the chamber 16 by means of rigid tube 64 and stopper 60. In operation, this flexible bubble tube 76 is placed so that it extends through tank cover 78 and into the fill pipe 12 such that the opening 80 of the bubble tube 76 is below the surface level 82 of the liquid in the fill pipe.

As a result, the meniscus 84 at the interface between the liquid 23 and gas 27 in the slope tube moves. This movement may be monitored by providing a reference bar 86 which remains stationary with respect to said slope tube 24 while the test is being performed. This reference bar 86 may be of a construction which is permanently fixed in position, as shown in the drawings, or may be constructed such that it is movable with respect to the slope tube so that the reference point may be adjusted. Preferably, the reference bar is constructed from a wire, the ends of which are hooked around the sides of the helically coiled portion of the slope tube, as shown in FIG. 2.

Due to the fact that a relatively small leak in the tank 10 will result in a much greater drop in the surface level 82 of the liquid in the fill pipe 12 than would occur in the tank body 88, measuring the drop in liquid level in the fill pipe 12 results in a more sensitive detection means than when the same rate of leak is attempted to be detected by monitoring the tank body 88.

In operation, the apparatus is set up sufficiently close to the fill pipe 12 of the tank 10 so that the bubble tube 76 may be inserted therein. The tank is filled until the surface level 82 of the liquid approximates the top of the fill pipe 12. A liquid 22 is placed into the chamber 16 until the slope tube opening 36 is well submerged, whereby pressure within the chamber will cause the liquid 22 to be displaced into the slope tube as liquid 23.

To initiate the test, the source of pressurized air 18 or other gas is activated, such as by opening valve 72 to tank 70. Pressurized gas is communicated to the chamber lumen 50 by means of tube 68 to internally pressurize the chamber 16 above atmospheric pressure. The pressure is communicated from the chamber 50 to the fill pipe liquid 74 by bubble tube 76, and bubbles out of the opening 80 into the liquid 74 in fill pipe 12. Simultaneously, liquid 22 is forced from the chamber lumen 50 into the slope tube 24 to an initial position. It should be noted that the level of the meniscus 84 of the liquid 23 in the slope slope tube is a function of the depth to which the bubble tube opening 80 is inserted into the liquid 74 in the fill pipe 12.

After a brief period of operation, the unit will stabilize with a constant pressure flowing through the chamber 16, a relatively constant amount of gas bubbling through the tube 76 and liquid 23 being maintained at an essentially constant level in the slope tube 24. The level of meniscus 84 in the slope tube is then noted.

Leak testing is accomplished simply by monitoring the level of the meniscus 84 in the slope tube over a brief known interval, for example, ten to thirty minutes. If the tank is leaking, a minute decrease in the amount of liquid present in the tank 10 will lower the liquid surface level 82 in the relatively small diameter fill pipe 12 during the test interval. In the event of a leak, the bubble tube 76 will be at an effective depth less than its starting depth, and accordingly less pressure on the part of the compressed gas will be required to produce bubbling. Since the reading on the slope tube is directly proportional to the bubbling pressure, there will be a drop in the meniscus level 84 in the slope tube.

Once the time interval has elapsed, if a leak has been detected, the change in reading on the slope tube can be calibrated to a "gallons per hour" loss rate simply by refilling the fill pipe 12 with fluid until the original reading on the slope tube is restored. The amount of fluid necessary to restore the original reading is the amount which leaked from the tank during the test interval, and simple calculations will yield the necessary rate of loss.

Any testing device for use in this environment must account for thermal variation which causes expansion of the liquid contained in the tank. Because the test interval required by the present invention is relatively short, the present invention minimizes the effects of thermal interference with the measurement process. Additional safeguards include filling the tank to be tested 12 to 24 hours before the testing is to occur to permit thermal stabilization of the tank. If desired, a thermometer may be used with the apparatus to allow the user to assure himself that no substantial variation in the temperature of the liquid in the storage tank has occurred during the test period.

While I have shown and described a preferred embodiment of the invention, it will be appreciated that other embodiments are possible and accordingly the invention is to be limited solely by the claims presented herewith.

What is claimed is:

1. A portable, self-contained apparatus for detecting small leaks in a relatively large fluid storage tank having a fill-pipe, said apparatus comprising:
   (A) a substantially air-tight chamber having an outer surface and having a measuring liquid therein;
   (B) a slope tube communicating said measuring liquid to the atmosphere, at least a portion of said slope tube extending along the outer surface of said chamber;
   (C) means for supplying gas to said chamber;
   (D) tube means for communicating gas between said chamber and the fill-pipe of said fluid storage tank;
   whereby when gas is introduced into the chamber it pressurizes the chamber above atmospheric pressure causing; (i) gas to bubble out of the tube means into said fill pipe and (ii) measuring fluid in the chamber to be displaced into the slope tube, the amount of fluid so displaced being a function of the depth of the tube means in the liquid in said fill pipe, tank leakage being detectable by observation of changes in the fluid level in said slope tube.

2. The portable leak detector apparatus of claim 1 wherein said slope tube is helically coiled along the outer surface of said chamber.

3. The leak detector apparatus of claim 2 wherein a reference element is affixed to said helically coiled part of said slope tube.

4. The leak detector apparatus of claim 2 wherein said slope tube is secured between a said chamber and a transparent cylinder.

5. The leak detector apparatus of claim 1 wherein a planar base is affixed to the bottom of said chamber.

6. A portable, self-contained apparatus for detecting small leaks in a relatively large fluid storage tank having a fill-pipe, said apparatus comprising:

(A) A substantially air-tight chamber having an outer surface and having a measuring liquid therein;

(B) A slope tube helically coiled along the outer surface of said chamber;

(C) means for supplying gas to said chamber;

(D) tube means for communicating gas between said chamber and the fill-pipe of said fluid storage tank; whereby when gas is introduced into the chamber it pressurizes the chamber above atmospheric pressure causing; (i) gas to bubble out of the tube means into said fill pipe and (ii) measuring fluid in the chamber to be displaced into the slope tube, the amount of fluid so displaced being a function of the depth of the tube means in the liquid in said fill pipe, tank leakage being detectable by observation of changes in the fluid level in said slope tube.

* * * * *